(12) United States Patent
Rieul et al.

(10) Patent No.: US 10,867,200 B2
(45) Date of Patent: Dec. 15, 2020

(54) COMBINED BIOMETRIC RECOGNITION METHOD AND DEVICE

(71) Applicant: IDEMIA IDENTITY & SECURITY FRANCE, Issy-les-Moulineaux (FR)

(72) Inventors: François Rieul, Issy-les-Moulineaux (FR); Lauriane Couturier, Issy-les-Moulineaux (FR); Marie Jarlegan, Issy-les-Moulineaux (FR); Pierre Chastel, Issy-les-Moulineaux (FR)

(73) Assignee: Idemia Identity & Security France, Courbevoie (FR)

( * ) Notice: Subject to any disclaimer, the term of this patent is extended or adjusted under 35 U.S.C. 154(b) by 97 days.

(21) Appl. No.: 16/151,923

(22) Filed: Oct. 4, 2018

(65) Prior Publication Data

US 2019/0102639 A1    Apr. 4, 2019

(30) Foreign Application Priority Data

Oct. 4, 2017    (FR) ..................... 17 59285

(51) Int. Cl.
    *G06K 9/00*      (2006.01)
    *G06F 21/32*     (2013.01)

(52) U.S. Cl.
    CPC ......... *G06K 9/00892* (2013.01); *G06F 21/32* (2013.01); *G06K 9/00087* (2013.01); *G06K 9/00288* (2013.01); *G06K 9/00926* (2013.01); *G06K 2009/00939* (2013.01)

(58) Field of Classification Search
    CPC .......... G06K 9/00892; G06K 9/00288; G06K 9/00926; G06K 9/00087; G06K 2009/00939
    USPC .......................................... 382/116
    See application file for complete search history.

(56) References Cited

U.S. PATENT DOCUMENTS

| | | | |
|---|---|---|---|
| 9,762,581 B1 | 9/2017 | Wang et al. | |
| 2008/0226136 A1* | 9/2008 | Takaku | G07C 9/37 382/115 |
| 2013/0148866 A1* | 6/2013 | Yan | G06K 9/00268 382/115 |
| 2015/0378433 A1 | 12/2015 | Savastinuk et al. | |
| 2016/0125179 A1* | 5/2016 | Bouatou | G06F 21/32 340/5.82 |
| 2017/0116401 A1 | 4/2017 | Kim et al. | |
| 2018/0025563 A1* | 1/2018 | Kerning | G08B 25/016 340/5.52 |
| 2019/0019184 A1* | 1/2019 | Lacey | G06Q 20/4016 |

* cited by examiner

*Primary Examiner* — Congvan Tran
(74) *Attorney, Agent, or Firm* — Muncy, Geissler, Olds & Lowe, P.C.

(57) ABSTRACT

A method for biometrically recognizing individuals, comprising the following steps:
  performing at least two biometric recognitions based on separate sets of biometric characteristics detected on an individual during at least one first and one second detection operations;
  detecting a third set of biometric characteristics during the first detection and a fourth set of biometric characteristics during the second detection;
  verifying that the third set of biometric characteristics matches the fourth set of biometric characteristics.
A corresponding enrolment method and a device to implement these methods.

9 Claims, 1 Drawing Sheet

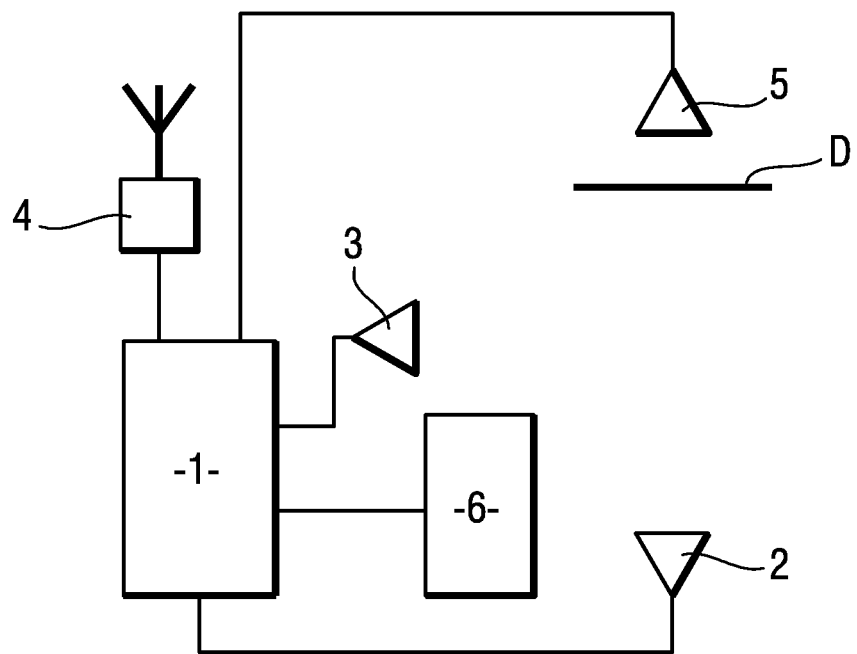

COMBINED BIOMETRIC RECOGNITION METHOD AND DEVICE

This invention relates to the field of biometric recognition.

BACKGROUND OF THE INVENTION

The use of biometric recognition methods to determine whether individuals are authorized to perform an action, such as entering into premises or accessing information, for example via a computer system, is known.

A method of biometric recognition conventionally comprises the following steps:
  detecting biometric characteristics on an individual;
  comparing the detected biometric characteristics with stored biometric characteristics;
  considering the individual recognized when the detected biometric characteristics match the stored biometric characteristics.

In order to make fraud more difficult, some biometric recognition methods comprise the following steps:
  performing a first biometric recognition based on a first set of biometric characteristics detected on an individual during at least one first detection operation;
  performing a second biometric recognition based on a second set of biometric characteristics detected on this individual during a second detection operation, the second set of biometric characteristics being separate from the first set of biometric characteristics;
  considering the individual recognized in the event that the two biometric recognitions are successful.

In a conventional implementation, the first biometric recognition is performed by retrieving first biometric characteristics from a portrait in an identity document and by comparing them to the first biometric characteristics detected on the holder of the identity document. The second biometric recognition is performed by retrieving second biometric characteristics, those of a fingerprint stored in the identity document, and by comparing them to the second biometric characteristics detected on the holder of the identity document.

It appears that this biometric recognition method could be fooled by using biometric characteristics belonging to two separate individuals for the two biometric recognitions.

PURPOSE OF THE INVENTION

One aim of the invention is to improve the robustness of these biometric recognition methods.

BRIEF SUMMARY OF THE INVENTION

For this purpose, the invention provides for a method of biometric recognition of individuals, comprising the following steps:
  performing a first biometric recognition based on a first set of biometric characteristics detected on an individual during at least one first detection operation;
  performing a second biometric recognition based on a second set of biometric characteristics detected on this individual during a second detection operation, the second set of biometric characteristics being separate from the first set of biometric characteristics.

The method includes the steps of:
  detecting a third set of biometric characteristics during the first detection and a fourth set of biometric characteristics during the second detection;
  verifying that the third set of biometric characteristics matches the fourth set of biometric characteristics;
  considering the individual as recognized in the event that the biometric recognitions succeed and if the third set of biometric characteristics matches the fourth set of biometric characteristics.

The comparison of the third set of characteristics with the fourth set of characteristics thus ensures that the first set of characteristics and the second set of characteristics belong to the same individual. This thus allows the biometric recognition to be validated and therefore increases its reliability.

Preferably, the third set of biometric characteristics and the fourth set of biometric characteristics include parameters of the individual's blood flow, such as the pulse frequency and phase.

The blood flow is affected by the pulses produced by the heart: the resulting variations in the blood flow can be detected on any human body part that is irrigated by blood vessels.

The invention also relates to a method for automatically enrolling an individual by recording a first set of biometric characteristics detected on an individual during a first detection operation and a second set of biometric characteristics detected on this individual during a second detection operation, in view of subsequently performing a biometric recognition, the second set of biometric characteristics being separate from the first set of biometric characteristics.

The method includes the steps of:
  detecting a third set of biometric characteristics during the first detection and a fourth set of biometric characteristics during the second detection;
  verifying that the third set of biometric characteristics matches the fourth set of biometric characteristics;
  considering the enrolment valid if the third set of biometric characteristics matches the fourth set of biometric characteristics.

Here again, the comparison of the third set of characteristics with the fourth set of biometric characteristics thus ensures that the first set of characteristics and the second set of characteristics belong to the same individual. This thus makes it possible to reveal an attempted fraud during enrolment.

Finally, the invention relates to a biometric recognition device comprising a processing unit connected to at least one device for recording two separate sets of biometric characteristics during two detection operations and one device for recording a third set of biometric characteristics and a fourth set of biometric characteristics during the two detection operations, the processing unit being arranged to execute a computer program so as to implement a recognition method and/or the enrolment method according to the invention.

Other characteristics and advantages of the invention will become apparent upon reading the following description of particular non-restrictive embodiments of the invention.

BRIEF DESCRIPTION OF THE FIGURES

Reference will be made to the single FIGURE appended herewith, which schematically shows a device for implementing the enrolment method and the biometric recognition method of the invention.

DETAILED DESCRIPTION OF THE INVENTION

The device and the methods of the invention are described here in relation to a dual biometric recognition based, on the one hand, on the biometric characteristics of the face, hereinafter the first set of characteristics and, on the other hand, on the biometric characteristics of a fingerprint, hereinafter the second set of characteristics.

The invention is described here in the application of an identity check based on an identity document D, such as a biometric passport. Such an identity document includes an optically machine-readable area by means of a character recognition program (this program is commonly called OCR). In this area are printed among others the passport owner's last name and first names, his or her date of birth, as well as the passport number, country of issue and expiration date. Such an identity document also includes a memory module in the form of an electronic circuit that is fastened to the cover of the document and which includes an integrated circuit and a radio frequency near field communication (or NFC) antenna (the electronic circuit complies with the ISO 14443 standard). The memory module is arranged to perform cryptographic calculations and contains in digitized form the facial photograph of the owner of the identity document and biometric data relating to at least one fingerprint in the present example.

With reference to the FIGURE, the device for implementing the recognition method according to the invention includes a processing unit 1 connected to the following:
- a fingerprint reader 2 to capture at least one image of a fingerprint of an individual holding an identity document D;
- a facial camera 3 arranged to capture images of the individual's face;
- a radio frequency transmitter/receiver 4 to communicate wirelessly with the memory module that is incorporated in the identity document D;
- a reading camera 5 arranged to read the information appearing in the readable area of the identity document D;
- a screen 6 to display instructions for using the device.

The processing unit 1 comprises a processor connected to a memory containing computer programs so that the processor is able to execute these programs and control the various components to which it is connected. One of these computer programs comprises instructions for implementing the automatic enrolment method and the biometric recognition method according to the invention.

The automatic enrolment method is used to store the biometric characteristics of individuals so that these individuals may later be subject to biometric recognition.

The computer program controls the processing unit 1 to carry out the steps of the method to enrol an individual, whose memory module in the identity document D is empty.

The automatic enrolment method according to the invention includes a first step that consists in capturing images of the individual's face using the facial camera 3. During a first detection step, the images are processed by the processing unit 1 to retrieve the following from them:
- biometric characteristics of the individual's face forming the first set of biometric characteristics;
- a pulse frequency and a pulse phase of the blood flow forming a third set of biometric characteristics.

The automatic enrolment method according to the invention continues with a second step that consists in capturing images of the individual's fingerprints using the optical fingerprint sensor 2. During a second detection step, the images are processed by the processing unit 1 to retrieve the following from them:
- biometric characteristics of the individual's fingerprints forming the second set of biometric characteristics;
- a pulse frequency and a pulse phase of the blood flow forming a fourth set of biometric characteristics.

It should be noted that the second set of biometric characteristics, in this case fingerprint biometric characteristics, is separate from the first set of biometric characteristics, in this case facial biometric characteristics. It should also be noted that the third set of biometric characteristics includes the same blood flow parameters as the fourth set of biometric characteristics, the difference being that these parameters will not have been detected on the same part of the individual's body.

The enrolment method continues with a dual verification as follows:
- verifying that the third set of biometric characteristics matches the fourth set of biometric characteristics;
- verifying that the first set of biometric characteristics matches the facial biometric characteristics retrieved from a digitized photograph of the owner of the identity document D.

The operation verifying that the third set of biometric characteristics matches the fourth set of biometric characteristics thus consists in verifying that:
- the pulse frequency detected during the first detection is identical to the pulse frequency detected during the second detection;
- the phase detected during the first detection matches the phase detected during the second detection.

To compare the phase of the blood pulse detected at one location of the human body and the phase of the blood pulse detected at another location of the human body, the difference in the time of propagation of the blood pulse between the heart and these two locations is taken into account. Indeed, if the first detection is performed on a part of the human body located at the same distance of the heart than the part of the human body on which the second detection is performed, the phase detected during the first detection is identical to the phase detected during the second detection. However, if the two parts of the body are located at different distances from the heart, there is a difference in the time of propagation of the pulse to the two parts of the body: the phase detected during the first detection and the phase detected during the second detection are offset by the difference in time of propagation.

The operation verifying that the first set of biometric characteristics matches is performed in a conventional manner using a biometric recognition algorithm (o matching algorithm), which is known per se.

If these verifications are validated, the processing unit 1 considers the enrolment valid.

The processing unit 1 then enters into communication with the memory module of the document D via the transmitter/receiver 4 to store at least part of the first set of biometric characteristics and of the second set of biometric characteristics in the memory module.

It may in addition be provided that the first set of biometric characteristics and the second set of biometric characteristics are stored in a central database with the information found in the machine-readable area. It may also be provided that one of the third and fourth sets of biometric characteristics is stored in the memory module of the document D and/or in the central database with the information found in the machine-readable area.

The processing unit 1 uses the display 6 to describe the enrolment sequence and broadcast a warning message when at least one of the verifications is not validated.

The biometric recognition method of the invention will now be described. This method aims to ensure that the holder of the identity document D is indeed its enrolled owner.

The computer program controls the processing unit 1 to carry out the steps of the method to biometrically recognize an individual, who is the holder of the identity document D.

The holder of the identity document D starts by placing the identity document D facing the reading camera 5 and the processing unit 1 controls an image capture of the document D from which the processing unit 1 reads the information relating to the owner and to the identity document D. The processing unit 1 also controls the transmitter/receiver 4 to read the information contained in the memory module of the identity document D and compare it to the information read. In the event that there are any differences, the processing unit 1 controls the display 6 to broadcast a warning message.

The biometric recognition method according to the invention includes the following steps:
- capturing by means of the facial camera 3 images of the individual's face during a first detection operation and using the processing unit 1 to perform a first biometric recognition based on a first set of biometric characteristics detected on one of these images;
- letting the processing unit 1 detect a third set of biometric characteristics on the images captured during the first detection operation;
- capturing by means of the fingerprint sensor 2 images of one of the individual's fingerprints during a second detection operation and using the processing unit 1 to perform a second biometric recognition based on a second set of biometric characteristics detected on one of these images;
- letting the processing unit 1 detect a fourth set of biometric characteristics on the images captured during the second detection operation;
- letting the processing unit 1 verify that the third set of biometric characteristics matches the fourth set of biometric characteristics;
- considering the individual as recognized in the event that the biometric recognitions succeed and if the third set of biometric characteristics matches the fourth set of biometric characteristics.

As explained above, the third set of biometric characteristics and the fourth set of biometric characteristics match one another and include parameters of the individual's blood flow, such as the pulse frequency and the phase. The operation verifying that the third set of biometric characteristics matches the fourth set of biometric characteristics thus consists in verifying that:
- the pulse frequency detected during the first detection is identical to the pulse frequency detected during the second detection;
- the phase detected during the first detection matches the phase detected during the second detection taking into account the time of propagation of the pulse from the heart to the first detection area and to the second detection area.

It should be noted that the first set of biometric characteristics, consisting of facial biometric characteristics, and the second set of biometric characteristics, consisting of fingerprint biometric characteristics, are detected on different parts of the individual's body.

The first biometric recognition operation is performed by comparing, by means of the matching algorithm, the facial biometric characteristics detected during the first detection operation to the facial biometric characteristics retrieved from the digitized portrait stored in the memory of the memory module of the document D. The processing unit 1 queries the memory module using the transmitter/receiver 4.

The second biometric recognition operation is performed by comparing, by means of the matching algorithm, the fingerprint biometric characteristics detected during the second detection operation to the fingerprint biometric characteristics stored in the memory of the memory module of the document D.

The biometric recognition operations can be performed after verifying that the third and fourth sets of biometric characteristics match.

Of course, the invention is not limited to the described embodiments but encompasses any alternative solution within the scope of the invention as defined in the claims.

In particular, at least one of the third set of biometric characteristics and fourth set of biometric characteristics is recorded in the document D during enrolment. The biometric recognition thus includes a further detection operation comparing the third set of biometric characteristics detected on the individual with that stored in the document D.

For instance, the first set of biometric characteristics and the second set of biometric characteristics consist of biometric characteristics respectively belonging to:
- one finger and one face;
- two fingers;
- the right hand and the left hand;
- the iris of one eye and the fingerprint, etc.

The stored facial biometric characteristics can be read in a memory of an integrated circuit attached to the document or retrieved from a photograph of the face fastened to or printed on the document.

The biometric characteristics can be stored in a memory element integrated in an identity document—e.g. an RFID or NFC integrated circuit, or even a 3D bar code—in a memory of a computer unit, such as a personal computer, server, telecommunications terminal, etc.

The detection steps can be reversed.

The same method can be used for another use case: an identity document with a first set of biometric characteristics (e.g. the face) is used and a document is to be generated with a second set of biometric characteristics (e.g. a boarding pass with a fingerprint). The method is then as follows:
- the first set of biometric characteristics and the second set of biometric characteristics are captured;
- a verification is made to ascertain that the first set of biometric characteristics captured matches that of the identity document;
- a third set of biometric characteristics (the pulse on the face) and a fourth set of biometric characteristics (the pulse on the finger) are captured;
- a verification is made to ascertain that the third set of biometric characteristics matches the fourth set of biometric characteristics;
- if so, then the other document is generated by incorporating the third set of biometric characteristics in it.

The same method can be used for yet another use case at an airport:
at check-in:
- the first set of biometric characteristics and the second set of biometric characteristics are captured;
- the first set of biometric characteristics and the second set of biometric characteristics are verified;

a third set of biometric characteristics (the pulse on the face) and a fourth set of biometric characteristics (the pulse on the finger) are captured;

a verification is made to ascertain that the third set of biometric characteristics matches the fourth set of biometric characteristics;

the third set of biometric characteristics is stored in a database.

when going through security or when entering the plane, the third set of biometric characteristics is captured, and a verification is made to ascertain that it matches that which is stored in the database (this avoids having to show your identity document again).

The invention claimed is:

1. A method for biometrically recognizing individuals, comprising the following steps:
performing a first biometric recognition by comparing a first set of biometric characteristics detected on an individual during at least one first detection operation with a first set of reference/stored biometric characteristics;
performing a second biometric recognition by comparing a second set of biometric characteristics detected on this individual during a second detection operation with a second set of reference/stored biometric characteristics, the second set of biometric characteristics being separate from the first set of biometric characteristics;
detecting a third set of biometric characteristics during the first detection operation and a fourth set of biometric characteristics during the second detection operation;
verifying that the third set of biometric characteristics matches the fourth set of biometric characteristics;
considering the individual as recognized in the event that the biometric recognitions succeed and if the third set of biometric characteristics matches the fourth set of biometric characteristics.

2. The method according to claim 1, wherein the third set of biometric characteristics and the fourth set of biometric characteristics include parameters of the individual's blood flow, wherein the parameters of the individual's blood flow are pulse frequency and phase.

3. The method according to claim 1, wherein the first set of biometric characteristics and the second set of biometric characteristics are detected on different parts of the individual's body.

4. The method according to claim 3, wherein the first set of biometric characteristics consists of facial characteristics.

5. The method according to claim 3, wherein the second set of biometric characteristics consists of fingerprint characteristics.

6. A method for automatically enrolling an individual, in view of subsequently performing a biometric recognition, by recording a first set of biometric characteristics detected on an individual during a first detection operation and a second set of biometric characteristics detected on this individual during a second detection operation, the second set of biometric characteristics being separate from the first set of biometric characteristics;
the method comprising the following steps:
detecting a third set of biometric characteristics during the first detection operation and a fourth set of biometric characteristics during the second detection operation;
verifying that the third set of biometric characteristics matches the fourth set of biometric characteristics;
considering the enrolment valid if the third set of biometric characteristics matches the fourth set of biometric characteristics.

7. The method according to claim 6, wherein at least one of the third set of biometric characteristics and fourth set of biometric characteristics is recorded.

8. The method according to claim 6, wherein the third set of biometric characteristics and the fourth set of biometric characteristics include parameters of the individual's blood flow, wherein the parameters of the individual's blood flow are are pulse frequency and phase.

9. A biometric recognition device comprising a processing unit connected to at least one device for recording two separate sets of biometric characteristics during two detection operations and one device for recording a third set of biometric characteristics and a fourth set of biometric characteristics during the two detection operations, the processing unit being arranged to execute a computer program so as to implement a method according to claim 1.

* * * * *